(12) United States Patent
Paulo et al.

(10) Patent No.: US 10,527,210 B2
(45) Date of Patent: Jan. 7, 2020

(54) FLEXIBLE PIPE AND METHOD OF MANUFACTURE OF FLEXIBLE PIPE

(71) Applicant: GE Oil & Gas UK Limited, Nailsea, Bristol (GB)

(72) Inventors: Fernando Bezerra Paulo, Rio de Janeiro (BR); Italo de Lemos Souza, Rio de Janeiro (BR); Valdeir Tinoco da Silva, Rio de Janeiro (BR)

(73) Assignee: GE Oil & Gas UK Limited, Nalsea, Bristol (GB)

( * ) Notice: Subject to any disclaimer, the term of this patent is extended or adjusted under 35 U.S.C. 154(b) by 1083 days.

(21) Appl. No.: 14/783,747

(22) PCT Filed: Apr. 11, 2014

(86) PCT No.: PCT/GB2014/051139
§ 371 (c)(1),
(2) Date: Oct. 9, 2015

(87) PCT Pub. No.: WO2014/170644
PCT Pub. Date: Oct. 23, 2014

(65) Prior Publication Data
US 2016/0069494 A1 Mar. 10, 2016

(30) Foreign Application Priority Data
Apr. 15, 2013 (GB) .................................... 1306823.4

(51) Int. Cl.
*F16L 33/01* (2006.01)
*B21C 37/12* (2006.01)
(Continued)

(52) U.S. Cl.
CPC .............. *F16L 33/01* (2013.01); *B21C 37/12* (2013.01); *E21B 17/085* (2013.01); *F16L 11/083* (2013.01);
(Continued)

(58) Field of Classification Search
CPC .. F16L 33/01; E21B 17/085; Y10T 29/49778; Y10T 29/4978; Y10T 29/49799
(Continued)

(56) References Cited

U.S. PATENT DOCUMENTS 2,394,632 A * 2/1946 Parker .................... F16L 33/224
285/222.1
2,833,567 A * 5/1958 Bacher ..................... F16L 33/01
285/95
(Continued)

FOREIGN PATENT DOCUMENTS

CN 101473154 A 7/2009
CN 101473157 A 7/2009
(Continued)

OTHER PUBLICATIONS

First Office Action and Search Report (including English translation) from State Intellectual Property Office of People's Republic of China for corresponding Chinese Application No. 201480021450.7, dated Oct. 8, 2016, 9 pages.
(Continued)

*Primary Examiner* — Jason L Vaughan
(74) *Attorney, Agent, or Firm* — Klarquist Sparkman, LLP

(57) ABSTRACT

A flexible pipe and method of producing a flexible pipe are disclosed. The method includes bending armour wires of a flexible pipe body about 10 to 50 degrees from a longitudinal axis of the pipe body using a temporary collar member; inserting a further collar member radially inwards of the bent armour wires such that a portion of the armour wires lay over the further collar member; and mating the flexible pipe body and further collar member with an end fitting body.

8 Claims, 8 Drawing Sheets

(51) Int. Cl.
*E21B 17/08* (2006.01)
*F16L 11/08* (2006.01)

(52) U.S. Cl.
CPC ...... *Y10T 29/4978* (2015.01); *Y10T 29/49799* (2015.01)

(58) Field of Classification Search
USPC .............................. 285/222.1, 222.2; 156/92
See application file for complete search history.

(56) References Cited

U.S. PATENT DOCUMENTS

| | | | | |
|---|---|---|---|---|
| 2,940,778 | A * | 6/1960 | Kaiser ................ | F16L 33/01 285/95 |
| 3,936,118 | A * | 2/1976 | Thiery ................ | F16L 33/01 439/191 |
| 4,875,717 | A * | 10/1989 | Policelli ................ | F16L 47/04 285/222.1 |
| 4,950,001 | A * | 8/1990 | Briggs ................ | F16L 47/02 285/222.1 |
| 5,918,641 | A * | 7/1999 | Hardy ................ | F16L 11/087 138/132 |
| 6,161,880 | A * | 12/2000 | Peppel ................ | F16L 33/01 285/104 |
| 6,360,781 | B1 * | 3/2002 | Braad ................ | F16L 25/08 138/109 |
| 6,412,825 | B1 * | 7/2002 | Langkjaer ............... | F16L 33/01 285/222.1 |
| 6,592,153 | B1 * | 7/2003 | Belcher ................ | F16L 33/01 285/222.2 |
| 6,742,813 | B1 * | 6/2004 | Glejbol ................ | F16L 33/01 285/222.1 |
| 6,923,477 | B2 * | 8/2005 | Buon ................ | F16L 33/003 138/109 |
| 7,175,208 | B2 * | 2/2007 | Belcher ................ | F16L 21/04 285/222.2 |
| 8,096,589 | B2 * | 1/2012 | De Aquino ............ | F16L 33/01 285/290.2 |
| 8,104,797 | B2 * | 1/2012 | Eccleston ............... | F16L 33/01 285/222.4 |
| 8,112,863 | B2 * | 2/2012 | Eccleston ............... | F16L 33/01 29/407.1 |
| 8,499,799 | B2 * | 8/2013 | Saltel ................ | F16L 33/01 138/109 |
| 9,618,419 | B2 * | 4/2017 | Demanze ............ | G01M 3/283 |
| 10,018,292 | B2 * | 7/2018 | Espinasse ............... | F16L 33/01 |
| 10,053,267 | B2 * | 8/2018 | Le Blan ............... | F16L 33/01 |
| 2004/0066035 | A1 * | 4/2004 | Buon ................ | F16L 33/003 285/222.2 |
| 2009/0140517 | A1 * | 6/2009 | Eccleston ............... | F16L 33/01 285/222.5 |
| 2010/0025985 | A1 * | 2/2010 | De Aquino ............ | F16L 33/01 285/222.2 |
| 2011/0100499 | A1 * | 5/2011 | Saltel ................ | F16L 33/01 138/137 |
| 2012/0211233 | A1 * | 8/2012 | Campello ............... | E21B 17/00 166/344 |
| 2012/0211975 | A1 * | 8/2012 | Campello ............... | F16L 33/01 285/222.2 |
| 2013/0192707 | A1 * | 8/2013 | Graham ............ | E21B 47/0006 138/109 |
| 2014/0312612 | A1 * | 10/2014 | Dhagat ................ | F16L 33/01 285/245 |

FOREIGN PATENT DOCUMENTS

| | | |
|---|---|---|
| CN | 202452000 U | 9/2012 |
| EP | 1867905 A1 | 12/2007 |
| JP | H04171390 A | 6/1992 |
| WO | WO2003/004921 A1 | 1/2003 |

OTHER PUBLICATIONS

International Search Report and Written Opinion of the International Searching Authority, dated Jul. 1, 2014, for corresponding International Application No. PCT/GB2014/051139, 13 pages.

* cited by examiner

FLEXIBLE PIPE AND METHOD OF MANUFACTURE OF FLEXIBLE PIPE

CROSS REFERENCE TO RELATED APPLICATIONS

This is the U.S. National Stage of International Application No. PCT/GB2014/051139, filed Apr. 11, 2014, which in turn claims the benefit of and priority to United Kingdom Patent Application No. GB1306823.4, filed Apr. 15, 2013.

The present invention relates to flexible pipe components and a method of manufacture of a flexible pipe. In particular, but not exclusively, the present invention relates to a method of terminating pipe layers such as wound wires in an end fitting.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers. Each layer of the pipe body is carefully terminated in an end fitting, to ensure that each layer is separately secured and linked into the end fitting, with leak paths avoided.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time. A tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs.

Unbonded flexible pipe has been used for deep water (less than 3,300 feet (1,005.84 metres)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the armour layers of the flexible pipe body is increased.

Flexible pipe may also be used for shallow water applications (for example less than around 500 metres depth) or even for shore (overland) applications.

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. FIG. 2 illustrates a riser assembly 200 suitable for transporting production fluid such as oil and/or gas and/or water from a sub-sea location 201 to a floating facility 202.

A cross-section of a known end fitting assembly 300 is shown in FIG. 3. The end fitting 300 includes an end fitting body 301, which includes an internal bore 302 running along its length. The end fitting body is made from steel or other such rigid material. At a first end of the end fitting body 301 there is defined an open mouth region 303 into which an end of a segment of flexible pipe body 100 is located and then terminated. At a further end of the end fitting body 301 is a connector 304. This is formed as a substantially disk-like flared region on the end fitting body. The connector can be connected directly to a matching connector of a further end fitting body of an adjacent segment of flexible pipe body. This can be done using bolts or some other form of securing mechanism. In such a configuration the end fittings would be located in a back-to-back configuration. Alternatively the connector 304 may be connected to a floating or stationary structure such as a ship, platform or other such structure. Various layers of flexible pipe body are introduced to the end fitting assembly, cut to appropriate length, and sealingly engaged with a particular portion of the end fitting.

It is well-known that there are many varied problems associated with the provision of end fittings for ends of flexible pipe body. The end fittings must ensure both good fastening and good sealing. There is a need to seal the bore of the flexible pipe body with the bore of the end fitting. Particular problems occur when the various specific layers of the multi-layer flexible pipe body are terminated. The flexible pipe body may include layers having very different material characteristics such as single polymer layers and/or interlocked metallic layers. The termination of each of these layers in an end fitting brings with it characteristic problems.

Typically, tensile armour wires may be securely positioned during end fitting assembly by using a "spider". It will be appreciated that a plurality of tensile armour wires are used to form a tensile armour layer (being wound helically at relatively low angle) and therefore it can be difficult to handle such a plurality of wires making up a layer, particularly after the wires are cut and tend to naturally splay away from their helically wound position. The spider is a device that is temporarily attached to the flexible pipe for dealing with the tensile armour wires as they are cut and positioned in the end fitting, and to hold the wires well out of the way to allow access for termination activities related to sub-layers 103 and 102 of the flexible pipe body to progress. A spider has an annular body for positioning over a pipe body, usually over an outer sheath, and a number of holding arms that extend towards the cut end of the pipe body having hooked limbs for holding armour wires at a certain position. Additional separate temporary collars are positioned where the armour wires exit the flexible pipe body in order to control the bending radius of the wires as they are manipulated during the end fitting processes.

A known method for terminating a segment of flexible pipe body will be described with reference to FIG. 3. The flexible pipe body 100 is to be terminated in an end fitting 300. The end of the flexible pipe body is cut across at a desired length. Next various parts of the end fitting are threaded over the, at this stage, open end of the pipe. These parts include a jacket 307, end plate (outer sleeve) 310, and outer seal ring 311. Next the various layers making up the multi-layer flexible pipe are cut to selected lengths. For example, the outer sheath 108 is cut much shorter than the carcass 101 and barrier layer 102 whilst the tensile armour layers are cut even longer. Next an outer sleeve 412 is slotted into position at the open end of the flexible pipe body. For example, the neck of the outer sleeve may be slotted between the outer sheath and outer most tensile armour layer. Once slotted in position the outer sleeve is kept in place by pressure between the layers of the flexible pipe body. These squeeze the neck of the outer sleeve effectively locking it in place.

Once the outer sleeve has been inserted between the outer sheath 108 and the outer layer of tensile armours 106 the spider is attached to the flexible pipe body behind the position of the sleeve. After the spider is in position, each individual tensile armour wire is attended to separately, for example by using tools to crimp the wire and manipulate the wire away from the helical formation to a straight form. Then the wire is pulled back to around 90 degrees (i.e. perpendicular to the longitudinal axis of the pipe) and positioned in a holding arm of the spider. The plurality of arms on the spider are configured to receive and retain the ends of the armour wires once each is bent up to around a 90 degree position from the longitudinal axis of the flexible pipe body. This is continued with all wires evenly spaced with the holding arms. The bend occurs at a selected region 708. As shown in FIG. 3, this region corresponds to the location of the inner surface of the outer sleeve. Once the tensile wires are bent away from the pipe axis, the inner layers, e.g. carcass 101, barrier layer 102, pressure armour layer 103, are terminated in an end fitting by positioning the cut end of each layer against the end fitting body, with appropriate use of seals and collar members. Then, each tensile wire is again dealt with separately and taken from the holding arm of the spider and, using suitable tools, gradually bent towards the pipe axis and towards the end fitting, to a position as shown in FIG. 3. The wires are then held on position by use of straps close to the ends of the wires.

An inner collar 500 may then be secured in a position relative to the outer sleeve 412. This may be achieved using long bolts 314 or some other such securing means. Once the armour layers have been bent away from being parallel to the barrier layer and the inner collar is in place, a seal ring 600 is placed around the open end of the pipe. The end fitting body 301 is then moved towards the end of the body of the inner collar 500. The action of drawing the end fitting body on to the pipe swages the inner seal ring 600 down on to the fluid barrier. The end fitting body 301 is then moved towards the end of the body of the inner collar 500. As the end fitting is moved towards the flexible pipe, the flexible pipe may be held in a rigid position by the inner collar and outer sleeve. As the end fitting body is moved in a direction illustrated by arrow A in FIG. 3, an engagement surface formed as part of the shoulder 402 urges the sealing ring into an abutting relationship with the inner collar. Further movement from left to right, as shown in FIG. 3, causes the shoulder of the end fitting to urge the wedge-like portion of the seal ring inwards into a close sealing relationship with an outer layer of the barrier layer of the flexible pipe body. This energises the seal. The end fitting body 301 may then be bolted to the inner collar using bolts or some other securing mechanism. The free ends 312 of the armour wires are then bent into a position within the cavity 313 which is partially defined at this stage. Such a position is illustrated generally in FIG. 3. The armour wires may be supported on an outer rim surface of the body of the inner collar and an outer surface of the end fitting body. The wires may be secured in place using straps. The outer jacket 307 is then secured, using bolts 308, to the waist of the end fitting body 301. This forms the cavity 313. The outer seal ring 309 previously hooped on the flexible pipe body is now brought into position by sliding it in a direction illustrated by arrow B in FIG. 3, into the space formed between an inner surface of the jacket 307 and the outer sheath 108 of the flexible pipe body. The end ring 310 is then bolted to the jacket. As the ring is secured it is urged in a direction illustrated as direction B in FIG. 3 towards the jacket. This urges the sealing ring 309 towards abutment surface 311 on the jacket which activates the seal. At this stage the end fitting is hung in a vertical direction. Epoxy or some other flowable sealant is then injected through injection ports (not shown) to fill the cavity 313 in the end fitting. This locks the wires further in place and helps improve overall mechanical integrity.

The above-mentioned bending of the tensile armour wires can cause plastic deformation and add stress to the wires, leading to fatigue and possibly reducing the lifetime of an assembled pipe.

WO03/004921 discloses a flexible pipe in which armour wires are terminated in an end fitting by severe bending of the armour wires.

US2012/0211975 discloses an end fitting and method of assembling a flexible pipe whereby tensile armour wire bending is reduced. However, this document does not clearly disclose how to achieve the arrangement shown, or the method steps required to allow access to radially inner layers of the flexible pipe body.

According to a first aspect of the present invention there is provided a method of assembling a flexible pipe, comprising:

bending armour wires of a flexible pipe body about 10 to 50 degrees from a longitudinal axis of the pipe body using a temporary collar member;

inserting a further collar member radially inwards of the bent armour wires such that a portion of the armour wires lay over the further collar member; and mating the flexible pipe body and further collar member with an end fitting body.

According to a second aspect of the present invention there is provided a flexible pipe assembled by the method described above.

Certain embodiments of the invention provide the advantage that armour wires need not be bent away from the pipe axis to a large degree compared to some known methods. Therefore, plastic and elastic deformation of the armour wires is reduced, reducing stress concentration at the point of bending, which may lead to an increase in fatigue lifetime of the armour layer.

Certain embodiments of the invention provide a flexible pipe with armour wires that have been bent away from the pipe axis to only a small degree, thereby having reduced plastic and elastic deformation, reduced stress concentration at the point of bending and possibly increased fatigue lifetime of the armour layer.

Embodiments of the invention are further described hereinafter with reference to the accompanying drawings, in which.

In the drawings like reference numerals refer to like parts.

Figure 1A:
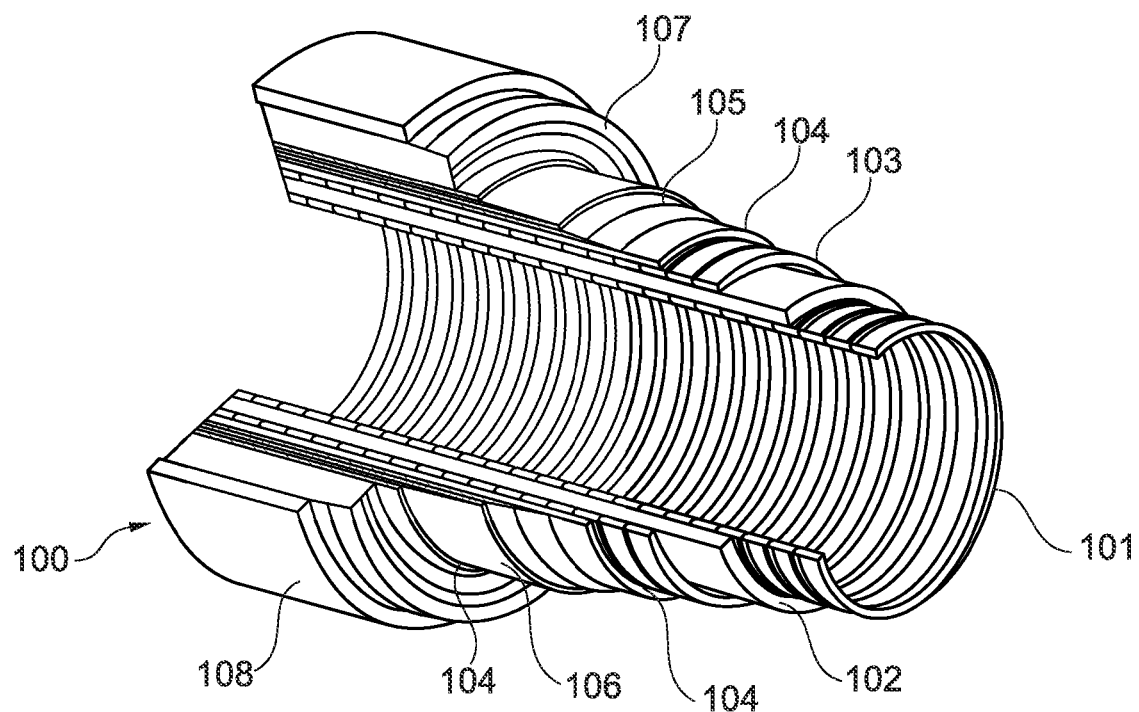
FIGS. 1a and 1b illustrate a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1a illustrates how pipe body 100 is formed in accordance with an embodiment of the present invention from a combination of layered materials that form a pressure-containing conduit. Although a number of particular layers are illustrated in FIG. 1a, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1a, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes a first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Figure 1B:
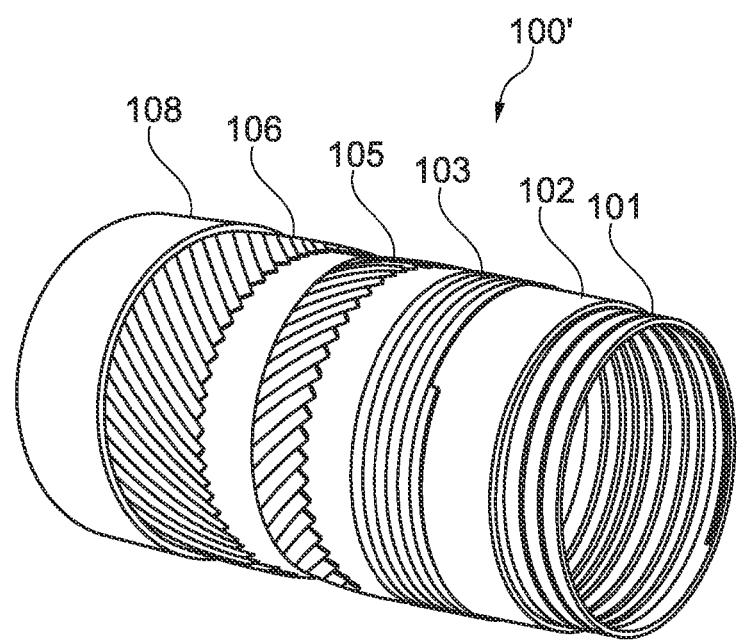

FIG. 1b shows another pipe body 100' illustrating a possible lay angle of the tensile armour wires 105, 106.

Each flexible pipe comprises at least one portion, sometimes referred to as a segment or section of pipe body 100 together with an end fitting located at least one end of the flexible pipe. An end fitting provides a mechanical device which forms the transition between the flexible pipe body and a connector. The different pipe layers as shown, for example, in FIG. 1a or 1b are terminated in the end fitting in such a way as to transfer the load between the flexible pipe and the connector.

Figure 2:
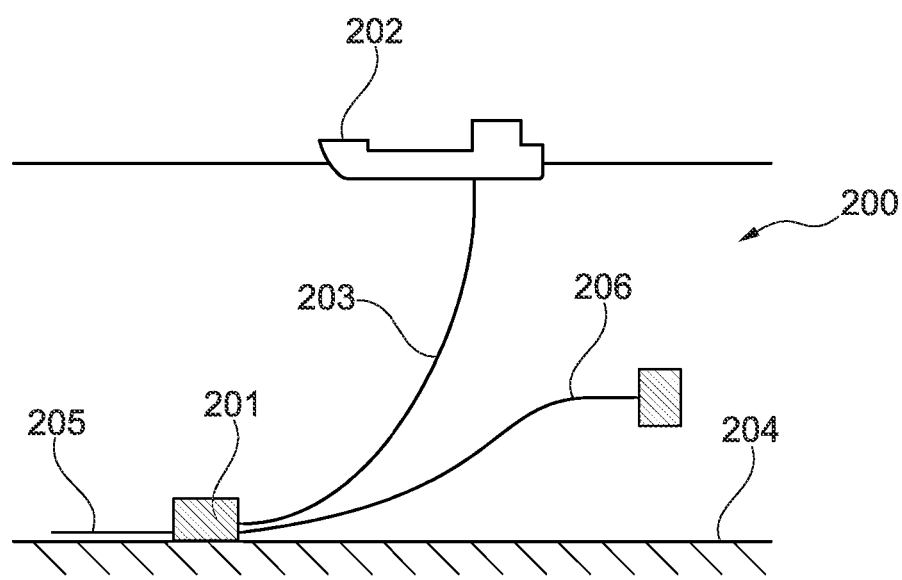
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings. It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes). FIG. 2 also illustrates how portions of flexible pipe can be utilised as a flow line 205 or jumper 206.

Figure 3:
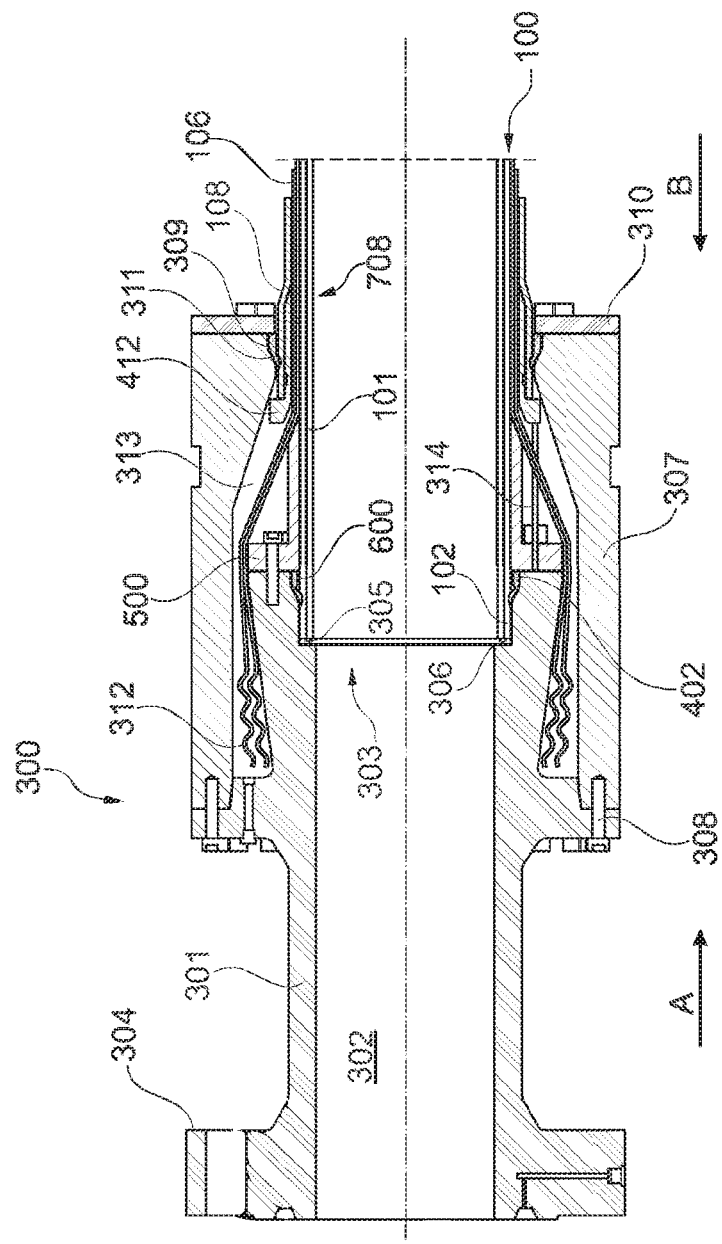
FIG. 3 illustrates a known end fitting assembly.
Figure 4:
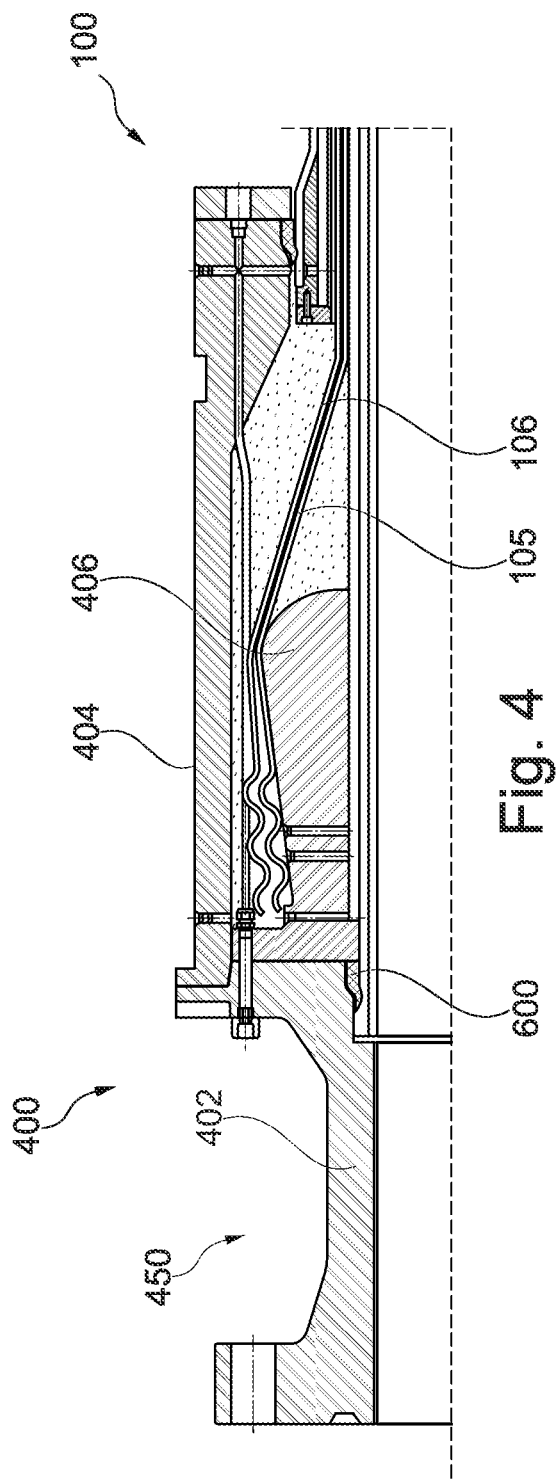
FIG. 4 illustrates an end fitting assembly according to the invention.

An embodiment of the invention will now be described with reference to FIGS. 4 to 6. As shown in FIG. 4, an end fitting assembly 400 includes a flexible pipe body 100 and an end fitting 450. It can be seen that the end fitting 450 is modified compared to some known end fittings. The annular body 402 has been shortened or cropped, such that rather than extending under a jacket 307 (about 50% of the way under the jacket, see FIG. 3), the annular body 402 extends to around the region of an end of a jacket 404, without extending under the jacket by more than 50 mm, and aptly without extending under the jacket by more than 25 mm. The annular member 402 is connected with an annular collar member 406 that abuts with the annular member 402 at one end thereof and extends away from the annular member and under the jacket 404 (in the finished assembly).

As such, the annular body and collar member may be considered together as a split annular member.

Figure 5:
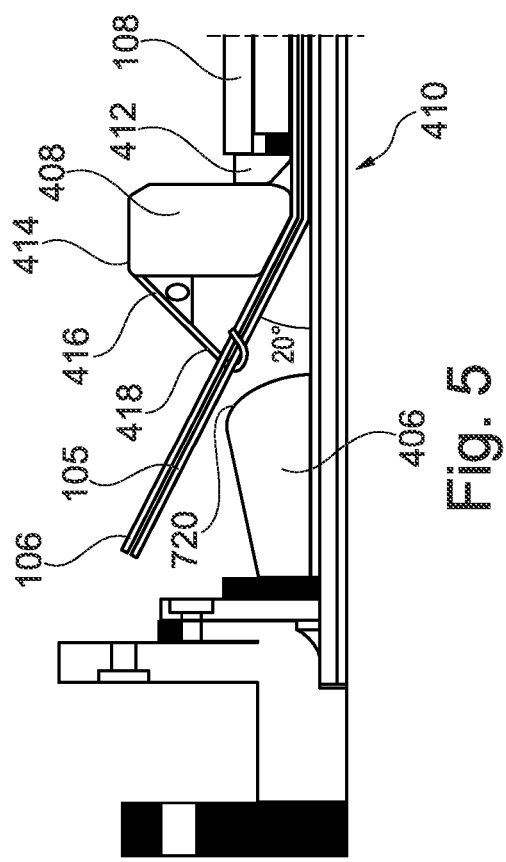
FIG. 5 illustrates an end fitting assembly during a stage of manufacture.

With reference to FIG. 5, a method of assembling a flexible pipe includes bending tensile armour wires of a flexible pipe body in a selected region 410 about 20 degrees from a longitudinal axis of the pipe body using a temporary collar member 408. The armour wires may be bent manually or by machine. Here the wires are bent individually away from the pipe axis and positioned to be held by a hooked region 418 of the temporary collar member 408.

The temporary collar member 408 includes an annular body portion 414 for inserting over the tensile armour layer 106 at around the selected region 410 and in an abutting relationship with the outer sleeve 412. The surface curvature of temporary collar member may be of geometric derivation for the purpose of temporarily extending a conical or curved opening surface present on the body section of the outer sleeve 412. The annular body portion may be provided in multiple (at least two) sections which are fastened or connected in series around the circumference of the pipe, and as such may be added or removed in a modular fashion as necessary or as most suitable for larger or smaller diameter (and respectively larger or smaller circumference) pipes. The temporary collar member 408 also includes a number of arm members 416 connected at one end thereof to the annular body portion and extending away with a hooked region 418 at a further end.

Figure 12:
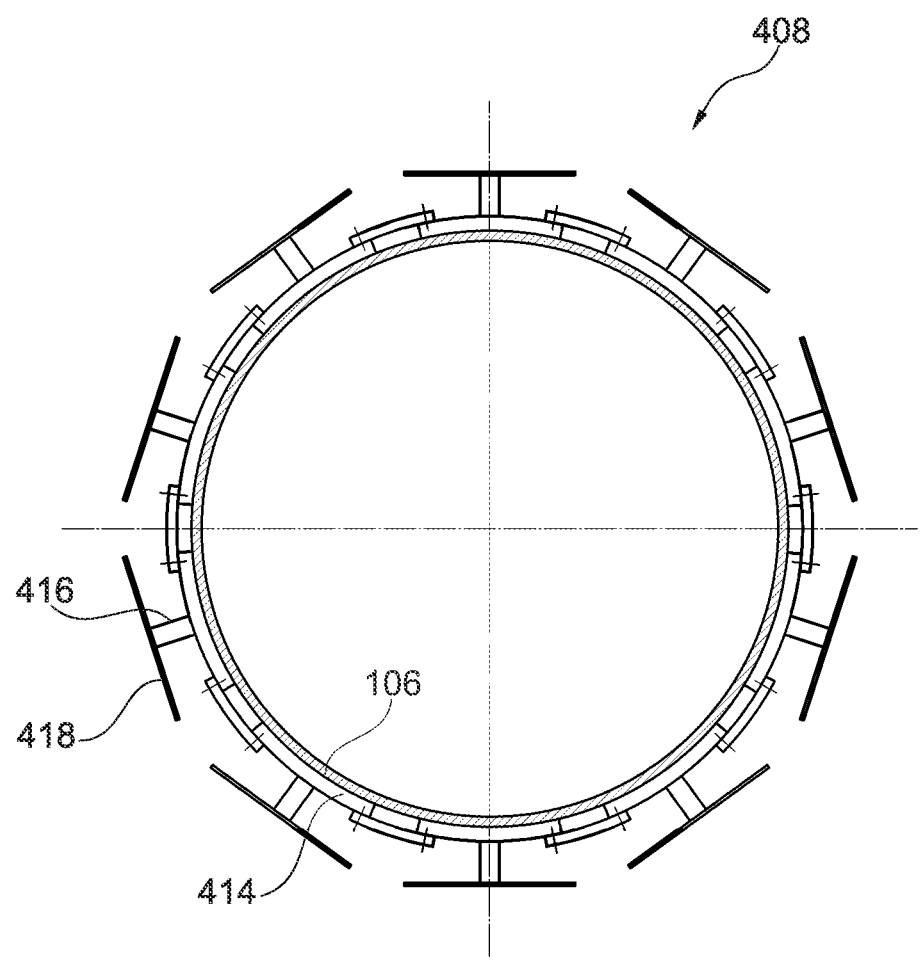
FIG. 12 illustrates an apparatus.

FIG. 12 shows another view of the temporary collar member 408, from a direction orthogonal to the view of FIG. 5.

The number of arm members 416 may vary and be chosen to suit the number of armour wires being assembled in the flexible pipe. Here there are 10 arm members. Hook regions may be provided in multiples on each arm member, extending in either or both circumferential directions (extending in both directions in FIG. 12). Each hooked region of each arm member may be used to hold one or more tensile armour wire in a desired position, the armour wires having been bent around 20 degrees from the pipe axis. The arms themselves may be moveable, for example being pivotable against the body portion to mechanically move the armour wires away from the pipe body longitudinal axis.

Figure 6A:
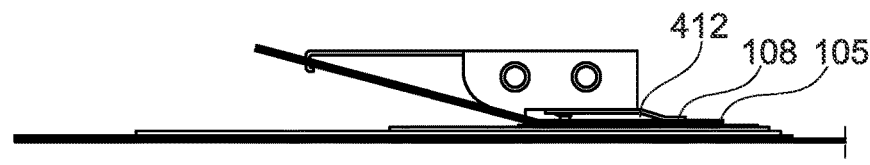
FIGS. 6a to 6c illustrate a method of manufacturing an end fitting assembly.

Prior to the stage of bending the armour wires, an outer sleeve 412 may be inserted between an outer shield layer 108 and a radially outer tensile armour layer 106. Then, the temporary collar member 408 is applied over the tensile armour layer 106 to be positioned in the selected region of bending and abutting at one end thereof (the end opposite to the end having the arms) with the sleeve 412. A similar embodiment is shown in FIG. 6a in which a temporary collar member is designed to abut with and overlie an outer sleeve 412. Abutment with the sleeve 412 helps to prevent the body of the temporary collar member from moving as armour wires are bend away, by acting as a gripping point against which forces are applied during bending.

Figure 6B:
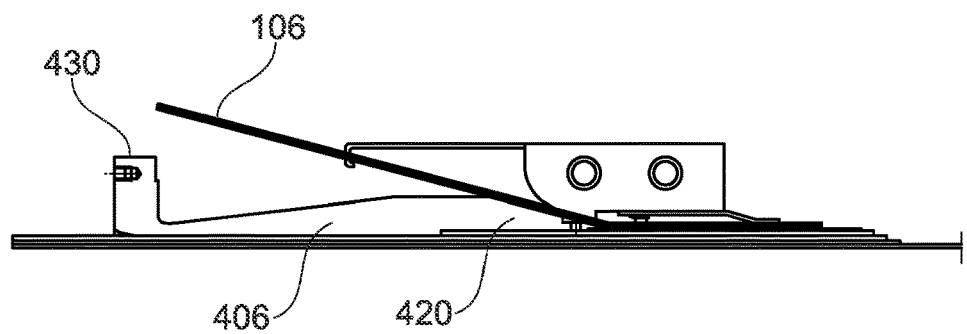

As shown in FIG. 6b, the collar member 406 may then be added to the assembly by insertion under the bent portions of the tensile armour wires 106. The ends of the armour wires therefore will lie radially outwards of the collar member 406. Here the collar member is shaped with a cross section having a tapered end 420, tapered at around 20 degrees, such that the bent armour wires 106 lay substantially precisely over the collar member tapered end 420. In this embodiment the collar member 406 is shaped to also receive and terminate a further pipe body layer, being a pressure armour layer 103. A radially inner surface of the collar member 406 is stepped so that an end of the pressure armour layer 103 abuts with the step of the collar member. In this embodiment part of the previously described annular member 402 has been given over to form a flange section 430 on collar member 406 in order to provide a connection with the jacket 404.

Figure 6C:
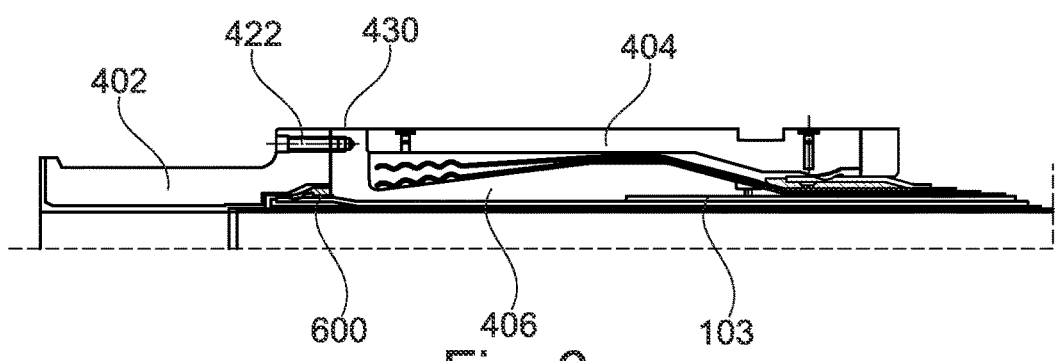

Then, as shown in FIG. 6c, the tensile armour wires 106 are crimped and clamped to the collar member 406 to hold them in position, allowing the temporary collar member to be removed.

Then, a jacket is slid over the area of termination and sealingly connected with the outer shield layer 108, and also with the collar member 406 using either bolts or a suitable threaded connection. The jacket acts as a housing to cover the various terminating layers of the pipe body and may house other features such as gas removal tubing, sensing wires, or the like. Next, the annular body 402 is mated with an end of the collar member 406 by bringing the annular body into an abutting position against an end face of the collar member (the opposite end to the tapered end). The radially innermost layers, i.e. the carcass 101 and barrier layer 102 are terminated against a stepped radially inner surface of the annular body 402, incorporating a seal member (in a known manner) to prevent fluid ingress from the bore of the pipe body in use. The annular body and collar member are affixed using long bolts 422 (in a known manner per se).

Figure 7:
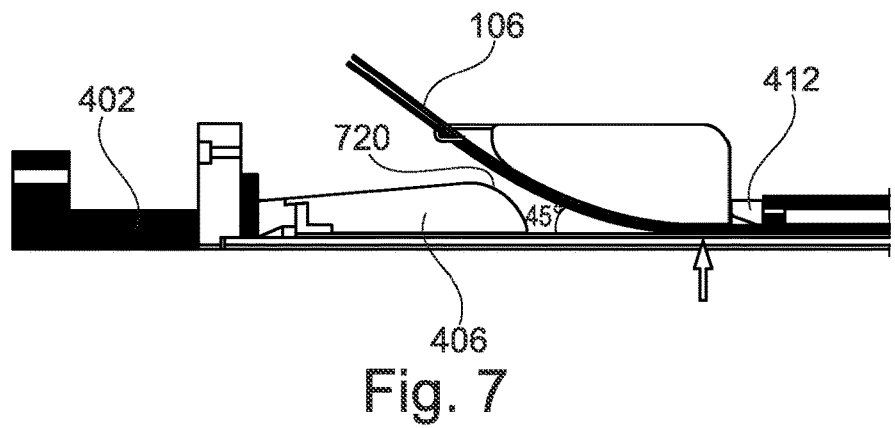
FIG. 7 illustrates an alternative end fitting assembly during a stage of manufacture.
Figure 8:
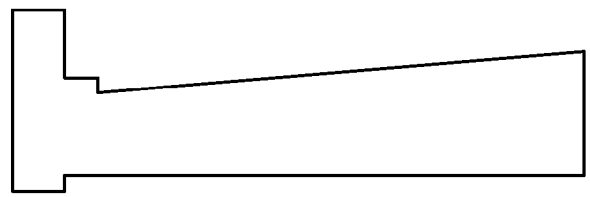
FIGS. 8 to 10 illustrate alternative collar member profiles.
Figure 9:
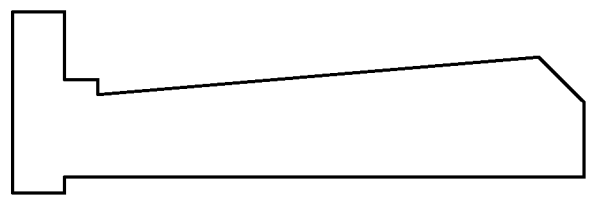
Figure 10:
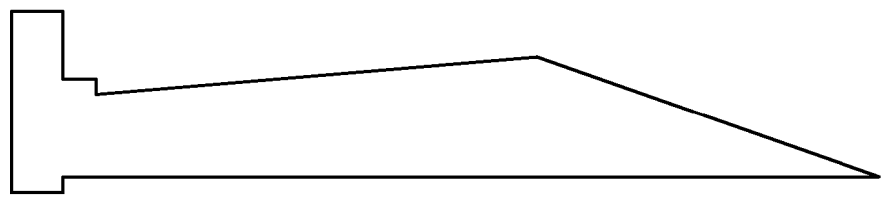

FIG. 7 shows another embodiment of the invention in which the armour wires are bent about 45 degrees from a longitudinal axis of the flexible pipe body. This method is performed in a similar manner to the method described above illustrated in FIG. 6, though a modification is made to the temporary collar member by giving the temporary collar member a curved surface against which tensile armour wires may be bent to gradually ease the wires away from the longitudinal axis of the pipe body. The arms 416 are arranged to hold tensile armour wires at around 45 degrees from the pipe body axis.

Various modifications to the detailed designs as described above are possible.

Although the examples above describe bending the wires at around 20 degrees, or 45 degrees, other angles could be made, for example an angle in the range of around 10 to 50 degrees, or 10 to 40 degrees, or 10 to 30 degrees, for example.

Although the example described above uses a collar member 406 having a profile with a tapered end, other profiles are possible. FIGS. 7, 8, 9 and 10 illustrate various possible collar member profiles against which an armour layer is overlaid. The collar member may have a curved surface for gradually bending the armour wires against, as shown in FIG. 7. Or, the collar member may have a flat or chamfered or other profile in accordance with the invention.

Figure 11A:
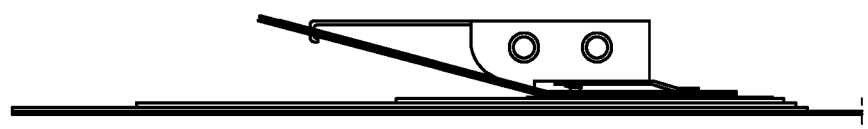
FIGS. 11a to 11c illustrate an alternative method of manufacturing an end fitting assembly.
Figure 11B:
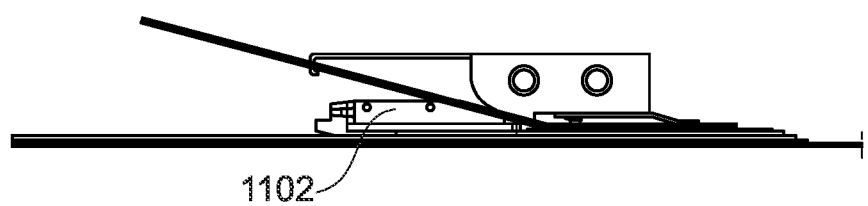
Figure 11C:
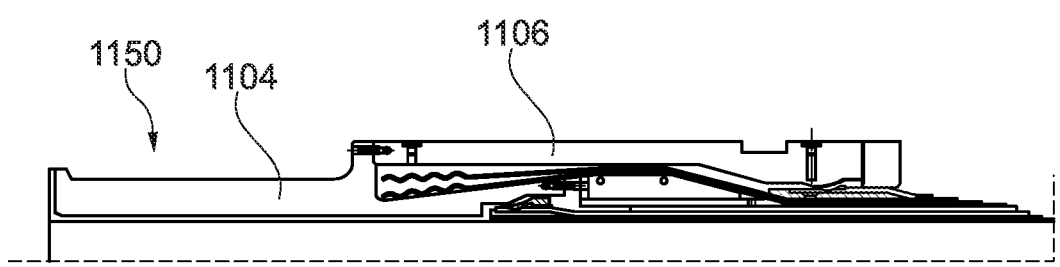

FIGS. 11a to 11c illustrate a method incorporating an alternative collar member profile 1102. As can be seen, the collar member 1102 is somewhat smaller than the collar member 406, and the annular body 1104 of the end fitting 1150 is somewhat larger than the annular body 402. It can be said that the 'split' of the end fitting assembly, i.e. the joint between the annular body and the collar member, has been moved relatively closer to the region of bending the armour wires (and further along the jacket 1106).

After armour wires have been bent away to around 20 degrees, as per FIG. 6*a* (see FIG. 11*a*), the alternative collar member 1102 is inserted beneath the bent wires (FIG. 11*b*).

Then, the flexible pipe layers that are radially inwards of the armour wires, e.g. the carcass layer and barrier layer, are cut to be shorter than the armour wires and to extend a relatively short distance further than the collar member 1102.

Then, similarly to FIG. 6*c*, the armour wires are secured, the temporary collar member is removed, and the annular body of the end fitting is brought towards the collar member (or vice versa), and mated with the collar member. The carcass layer and barrier layer are terminated against the end fitting, and the jacket is provided lastly.

The inventors have determined that in order to ensure that the armour wires in the flexible pipe body are not bent to beyond about 45 degrees from the longitudinal axis of the pipe it is necessary to both control the wire curvature and hold the wires in a low-angle position while completing the termination of carcass 101, barrier layer 102 and pressure armour 103 layers. In order to achieve this the inventors have devised a novel combination of tools, configured in such a way as to clasp around the flexible pipe body at the location of the exit from the flexible pipe body of the tensile armour wires 105 and 106, control the curvature of the armour wires to pre-determined radii and take-off angles, and contain the wires while other end fitting processes are taking place.

This invention is suited for use where the inner seal ring 600 is configured between the two sections of a split body (i.e. annular body 402 and collar member 406), in a section of the end fitting body axially spaced away from area at which the flexible pipe armour wires are lifted off and remotely positioned away from their natural layer position in the flexible pipe body, as shown in FIGS. 6*a* to 6*c*. A split body design is where there are two body components 402 and 406, as can be seen in FIGS. 6*b* and 6*c*, and where collar member 406 provides a connection with the jacket 404. This arrangement is specifically configured so that any leak past the metal-to metal seal by seal ring 600 has a leak path directly to the outside of the end fitting between the two body components 402 and 406, restricted only by o-rings, and is distinct from other embodiments described (in which the split or potential leak path leads to a location underneath (radially within) the jacket).

This invention is also particularly useful were the inner seal ring 600 is located in an abutting relation with an extended inner collar 406, as can be seen in FIG. 4, FIG. 5 and FIG. 7, where the inner collar also provides a crowned surface 720 over which the armour wires are laid and to which they may be secured, and the seal ring is configured in an area of the end fitting body where the armour wires are remotely displaced from their natural layer position in the flexible pipe body, but there is no connection with the jacket 404. This extended inner collar 406 is then connected to the annular member of the end fitting 402 (but not to the jacket 404), in order to urge the inner seal ring 600 into sealing configuration with the barrier layer 102. The extended inner collar is then defined as a component which connects to the body of the end fitting but not to the jacket. Possible shapes of extended inner collars can be seen in FIGS. 8 to 10.

With the above-described arrangements, the tensile armour wires are bent to a relatively lesser degree during termination of a flexible pipe body with an end fitting than in some known methods. As such, the plastic and elastic deformation undergone by the tensile armour wires is reduced compared to the known methods. Because of this, the stress concentration factor at the end fitting entrance is softened, and fatigue on the tensile armour wires is reduced. This may lead to a flexible pipe having an improved lifetime compared to known pipes.

By altering the location of the "split" or joint between the annular member 402 and the inner collar 406 (i.e. how far the split is positioned axially along the pipe body), the degree of bending of tensile armour wires is changed. Also, access to elements around the region where the tensile armour wires have been lifted can be improved. In some embodiments the swaging of the inner seal 600 may be performed later than usual methods, i.e. after the tensile layers have been terminated. In addition, when the "split" and seal ring 600 are provided to be located axially along the flexible pipe from the jacket, the swaging of the seal ring can be performed without interference or consideration of the locating of the jacket.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of assembling a flexible pipe, comprising:
   bending armour wires of a flexible pipe body about 10 to 50 degrees from a longitudinal axis of the pipe body using a temporary, first collar member;
   inserting a second collar member radially inwards of the bent armour wires such that a portion of the armour wires lay over the second collar member;

mating the flexible pipe body and second collar member with an end fitting body; and removing the temporary, first collar member after the armour wires have been secured over the second collar member.

2. A method as claimed in claim 1 wherein the second collar member has a curved cross section for bending the tensile armour wires over.

3. A method as claimed in claim 1 further comprising clamping the armour wires, at a location in the region of the end of the armour wires, to the second collar member.

4. A method as claimed in claim 1 further comprising inserting an insert between an outer shield layer and a radially inner layer of the flexible pipe body, and abutting the temporary, first collar member against the insert, prior to the bending step.

5. A method as claimed in claim 1 wherein the bending step comprises bending the armour wires about 10 to 40 degrees from the longitudinal axis of the pipe body.

6. A method as claimed in claim 5 wherein the bending step comprises bending the armour wires about 10 to 30 degrees from the longitudinal axis of the pipe body.

7. A method as claimed in claim 1 further comprising locating an outer jacket over the region of bent armour wires and securing an end of the jacket to the end fitting body and a further end of the jacket to an outer shield layer of the flexible pipe body.

8. A method as claimed in claim 1 wherein the armour wires are tensile armour wires.

* * * * *